United States Patent
Bedwell

(10) Patent No.: US 6,508,162 B2
(45) Date of Patent: Jan. 21, 2003

(54) DUAL ALLOY PISTON AND METHOD OF MANUFACTURE

(75) Inventor: Tommy J. Bedwell, Ann Arbor, MI (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 09/852,955

(22) Filed: May 10, 2001

(65) Prior Publication Data

US 2002/0166448 A1 Nov. 14, 2002

(51) Int. Cl.[7] .................................................. F16J 1/04
(52) U.S. Cl. .................... 92/222; 92/224; 29/888.04; 29/888.042
(58) Field of Search ................ 92/222, 224; 29/888.04, 29/888.042, 888.047

(56) References Cited

U.S. PATENT DOCUMENTS

| | | | |
|---|---|---|---|
| 1,296,593 A | 3/1919 | Bamberg | |
| 1,508,861 A | * 9/1924 | Taub | 92/224 |
| 1,717,750 A | 6/1929 | Wills | |
| 1,940,629 A | 12/1933 | Mahle | |
| 4,008,051 A | 2/1977 | Cadle | |
| 4,334,507 A | 6/1982 | Kohnert et al. | |
| 4,651,631 A | 3/1987 | Avezou | |
| 4,735,128 A | * 4/1988 | Mahrus | 29/888.047 X |
| 4,876,947 A | 10/1989 | Rhodes | |
| 4,971,003 A | 11/1990 | Suzuki et al. | |
| 5,042,364 A | 8/1991 | Okamura et al. | |
| 5,119,777 A | 6/1992 | Mielke et al. | |
| 5,352,538 A | 10/1994 | Takeda et al. | |
| 5,992,015 A | * 11/1999 | Kurita et al. | 29/888.042 |
| 6,032,570 A | 3/2000 | Koike et al. | |
| 6,240,827 B1 | * 6/2001 | Koike et al. | 92/224 X |

* cited by examiner

Primary Examiner—Edward K. Look
Assistant Examiner—John Ryznic
(74) Attorney, Agent, or Firm—Reising, Ethington, Barnes, Kisselle, Learman & McCulloch, P.C.

(57) ABSTRACT

A dual alloy metallic piston is made by casting a first alloy into a mold to form a corresponding first portion. Before the first alloy solidifies, a second alloy is cast into the mold to form a corresponding second portion of the piston. The first and second portions are joined across a transition zone which is a blend of the two alloys.

3 Claims, 1 Drawing Sheet

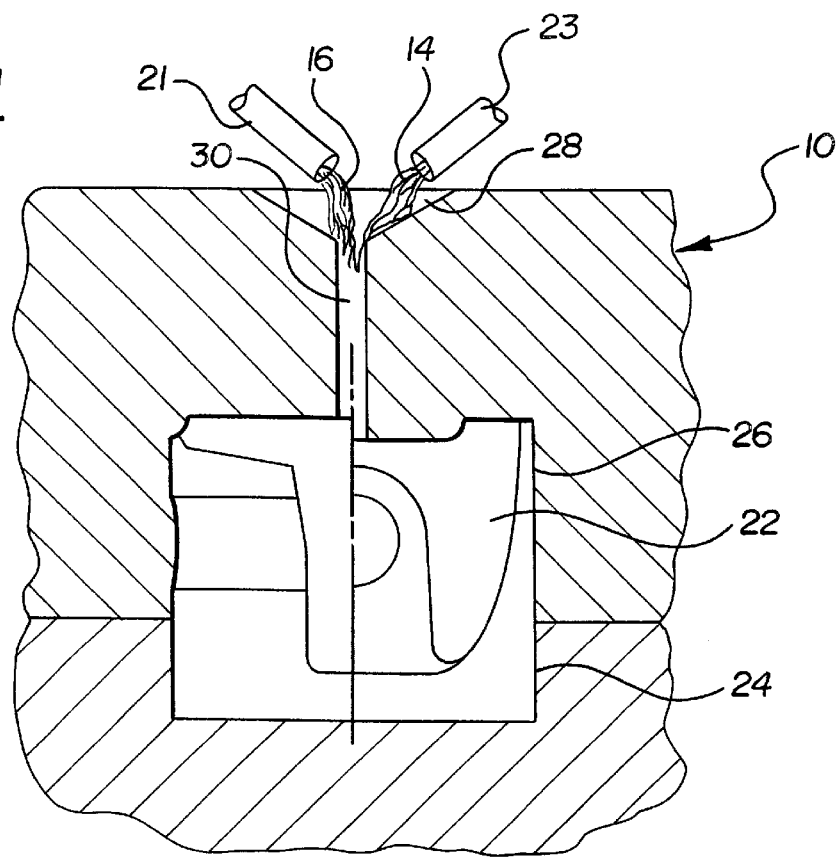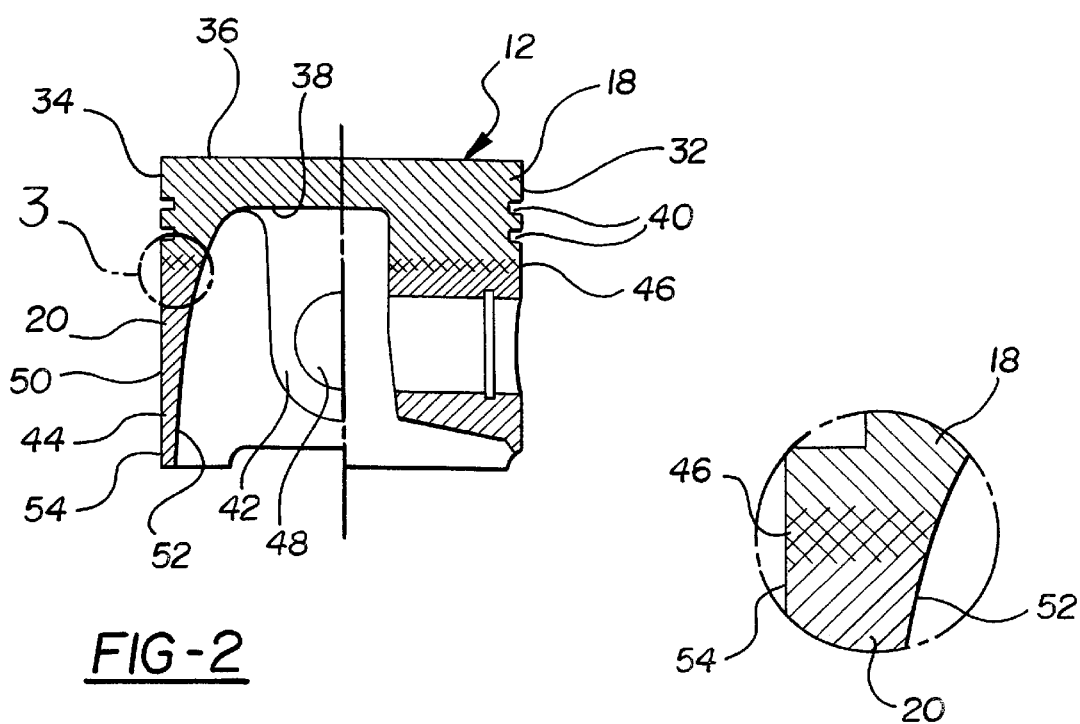

DUAL ALLOY PISTON AND METHOD OF MANUFACTURE

FIELD OF THE INVENTION

This invention relates generally to pistons, and more particularly to the casting of pistons.

BACKGROUND OF THE INVENTION

It is known to make a composite piston from a combination of different materials to tailor the physical properties of the materials to the needs of different regions of the piston.

For example, U.S. Pat. No. 1,940,629 shows an upper head portion piston made of a light metal united with a prefabricated lower portion of copper-beryllium alloy by shrink fit or cast-in-place techniques. U.S. Pat. No. 4,334,507 shows an aluminum piston body having molded in place therein a prefabricated insert of a different material. U.S. Pat. No. 4,651,631 shows a piston body having two prefabricated parts joined by welding. U.S. Pat. No. 6,032,570 shows a piston body having dissimilar materials bonded together by a forging process.

Each of the above composite piston structures involves at least one prefabricated component which is joined by insert molding or to another prefabricated component by a secondary joining operation. The secondary operations add costs and complexity to the manufacture of composite pistons.

A composite piston constructed according to the present invention overcomes or greatly minimizes the limitations of the known prior art.

SUMMARY OF THE INVENTION

A dual alloy metallic piston constructed according to the invention includes a first portion and a second portion formed from a first alloy and a second alloy, respectively, with each alloy having a different composition. The alloys are separately and sequentially poured into a mold cavity such that the first alloy forms the first portion, preferably the head of the piston, while the second alloy forms the second portion, preferably the body of the piston. The first and second portions are joined at a transition zone which comprises a mix of the first and second alloys.

One advantage offered by the invention is that a piston assembly having dissimilar alloy components can be constructed by a simple process using a single mold cavity, thereby eliminating the usual secondary operations such as welding or bolting to join dissimilar alloy components together.

Other advantages of the invention include the elimination of additional materials and components to join the dissimilar alloy components together, reduced labor and time, elimination of specialized joining equipment, and a high strength, high integrity transition region between the regions.

BRIEF DESCRIPTION OF THE DRAWINGS

These and other features and advantages of the present invention will become more readily appreciated when considered in connection with the following detailed description and appended drawings, wherein:

FIG. 1 is a schematic split sectional view of a mold illustrating the method of the invention;

FIG. 2 is a schematic split sectional view of a piston constructed according to the invention; and FIG. 3 is an enlarged fragmentary sectional view of the encircled portion of the piston shown in FIG. 2.

DETAILED DESCRIPTION

FIG. 1 schematically illustrates a mold 10 in which a piston 12 may be cast according to the invention. The mold 10 includes a mold cavity 24 having the shape of the piston to be formed. Accompanying cores used to form the piston shape have been omitted for clarity.

The piston 12 is made from at least two distinct alloys, schematically represented in FIG. 1 as alloy "A" and alloy "B" 16, 14 respectfully. The two alloys 16, 14 are used to form different regions of the piston 12 and the material selected for each alloy will take into account the desired properties of the piston regions to be formed from the respective alloys.

As schematically shown in FIGS. 1 and 2, alloy A is used to form a first portion 18 of the piston 12, whereas alloy B is used to form a second portion 20 of the piston 12. The first portion 18 may comprise, for example, the upper head portion of the piston 12 which is exposed to hot combustion gases, whereas the second portion 20 may comprise the lower main body region of the piston 12. In this example then, alloy A may comprise an alloy selected for high temperature strength, ductility and crack resistance characteristics, whereas alloy B comprises a different alloy composition providing scuff and wear resistance properties well suited for a piston skirt and pin bores.

According to the invention, molten alloy A is first cast from a source 21 of molten alloy A into the mold 10 where it flows into and fills a lower portion of the cavity 22, corresponding to the first portion 18 of the piston 12. After the pouring of alloy A is completed but prior to alloy A solidifying in the mold 10, alloy B is cast into the mold from a source 23 of molten alloy B to fill an upper portion of the mold cavity 22 corresponding to the second portion 20 of the piston 12. The second alloy B is poured quietly into the mold cavity 22 so as not to overly disturb the first alloy A in a manner that would lead to full mixing of the alloys A, B. Rather, the pouring is controlled so that the identity of each alloy A, B is preserved in the respective mold sections, and mixing of the alloys A, B occurs at their interface to produce a transition region 46 between the first and second portions 18, 20 made up of a mixture of alloy A and B material. The transition region 46 is best shown in FIG. 3. The alloys A and B are selected to be compatible to form the alloyed transition region 46 of alloys A and B.

The selection of the alloys A, B and the location of the transition region 46 may depend upon the requirements of a particular application, but the alloys are ones that are metallurgically compatible in forming the blended, or further alloyed transition region 46 which serves to join the separate, distinct alloys A, B of the first and second portions 18, 20.

Following casting, the piston 12 may be machined to provide one or more ring grooves 40 in a head of the piston, a pair of pin bosses 42 depending from the head and formed with aligned pin bores 48, and optionally a piston skirt 54 which may be formed as one piece or as a separate structure from the pin bosses 42.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of manufacturing a piston for an engine, comprising:

providing a mold formed with a mold cavity having a shape of a piston;

pouring a first molten alloy material into the mold cavity to form a first portion of the piston of the first alloy material; and before the first alloy fully solidifies in the mold cavity, pouring a second molten alloy material into the mold cavity having a different composition than that of the first alloy material to form a second portion of the piston of the second alloy material distinct from the first portion, and wherein the first portion and the second portion are joined together at a transition zone comprising a mixture of the first and second alloy materials.

2. The method of claim 1 wherein the first alloy material is selected to have a greater density than that of the second alloy material.

3. A cast piston, comprising:

a first portion cast in a mold activity from a first alloy;

a second portion cast in said mold cavity from a second alloy of different composition than that of said first alloy; and a cast transition zone between said first portion and said second portion comprising a cast mixture of said first alloy and said second alloy.

* * * * *